United States Patent
Yamartino

(10) Patent No.: US 6,345,095 B1
(45) Date of Patent: Feb. 5, 2002

(54) TELEPHONE NUMBER AREA CODE PREPROCESSOR

(76) Inventor: Robert J. Yamartino, 36 Orchard Rd., Bedford, MA (US) 01730

( * ) Notice: Subject to any disclaimer, the term of this patent is extended or adjusted under 35 U.S.C. 154(b) by 0 days.

(21) Appl. No.: 09/291,213

(22) Filed: Apr. 14, 1999

Related U.S. Application Data

(60) Provisional application No. 60/081,735, filed on Apr. 14, 1998.

(51) Int. Cl.[7] .............................................. A04M 1/56
(52) U.S. Cl. ............................................... 379/355.08
(58) Field of Search ...................... 379/355.07, 355.08, 379/355.09, 118, 127.01, 173

(56) References Cited

U.S. PATENT DOCUMENTS

| | | | |
|---|---|---|---|
| 5,157,719 A | 10/1992 | Waldman | 379/356 |
| 5,272,749 A | 12/1993 | Masek | 379/216 |
| 5,329,578 A | 7/1994 | Brennan et al. | 379/67 |
| 5,481,603 A | 1/1996 | Gutierrez et al. | 379/221 |
| 5,515,426 A | 5/1996 | Yacenda et al. | 379/201 |
| 5,553,119 A | 9/1996 | McAllister et al. | 379/67 |
| 5,583,926 A | 12/1996 | Venier et al. | 379/207 |
| 5,613,006 A | 3/1997 | Reese | 379/67 |
| 5,694,457 A | 12/1997 | Nixon et al. | 379/100 |
| 5,706,339 A | 1/1998 | Eisdorfer et al. | 379/211 |
| 5,710,808 A | 1/1998 | Eaton | 379/201 |
| 5,719,931 A | 2/1998 | Johnson | 379/356 |
| 5,732,132 A | 3/1998 | Hamada | 379/354 |
| 5,859,896 A | 1/1999 | Rosen | 379/350 |
| 5,859,901 A | 1/1999 | Brendzel et al. | 379/114 |
| 5,917,904 A | 6/1999 | Theiss | 379/355 |
| 5,946,390 A | 8/1999 | Boakes | 379/355 |
| 6,016,342 A | * 1/2000 | Schwartz | 379/209 |
| 6,134,319 A | * 10/2000 | Burg et al. | 379/88.03 X |
| 6,154,535 A | * 11/2000 | Velamuri et al. | 379/221 X |
| 6,292,557 B1 | * 9/2001 | Gabara | 379/355.08 |

* cited by examiner

Primary Examiner—Creighton Smith
(74) Attorney, Agent, or Firm—Covington & Burling

(57) ABSTRACT

This invention provides an apparatus and method for processing telephone numbers that assists telephone subscribers in reaching the desired destination when the area code is unknown or has changed. The invention can be integrated into a telephone unit, implemented as a stand-alone device connected to the subscriber's telephone line (including wireless, cable-TV lines, and other modes of telecommunication), implemented as a utility on a personal computer that may or may not be connected to the Internet or to a telephone line, or implemented as part of the telephone switching system. In a preferred embodiment, the apparatus for processing telephone numbers includes an area code processor and a caller interface. The area code processor has means, which are responsive to information about the called party, for producing a list of telephone numbers. The caller interface communicates with the area code processor and a calling party; and has means for monitoring call initiation signals, means for receiving called party information such as a telephone number, and means for selecting a target telephone number from the list of telephone numbers produced by the area code processor.

30 Claims, 2 Drawing Sheets

TELEPHONE NUMBER AREA CODE PREPROCESSOR

This application claims priority to Provisional Application No. 60/081,735 filed Apr. 14, 1998. The specification of No. 60/081,735 is incorporated herein by reference. This invention relates to the selection of telephone numbers, and more particularly to devices and methods for assisting telephone subscribers in connecting to the desired destination when the area code or service code is unknown or has changed.

BACKGROUND OF THE INVENTION

Description of the Relevant Art

In North America, the telecommunications numbering plan generally divides the country into geographical area code service areas. Each three-digit area code is divided into three-digit central office exchanges that generally cover geographical sub-areas of the area code service area. In the early days of telephony, the geographical sub-area served by a particular exchange would not generally overlap the geographical sub-area served by another exchange. Further, the geographical sub-areas of area codes were often established with sensitivity to existing political boundaries so that residents of a particular community, for example, shared the same area code.

Unfortunately, the number of subscribers that can be served by a particular exchange is limited by the number of digits that can uniquely identify a subscriber line within the exchange. The use of four-digit subscriber numbers limits the number of subscribers within an exchange to 10,000 telephone numbers. As particular geographical sub-areas develop, however, they may eventually require more than 10,000 subscriber numbers. This problem is typically resolved by defining new exchanges whose geographical sub-areas may overlap the geographical sub-areas of existing exchanges. However, with the exception of wireless exchanges, the geographical sub-area covered by a particular exchange is generally completely confined to a particular area code service area. This restriction ensures that duplicate three-digit central office exchange codes may be freely assigned in adjoining area code service areas.

The use of identical exchange codes in adjoining area code service areas, however, may create ambiguities when subscribers dial numbers outside of their local exchange. These ambiguities are resolved by requiring subscribers to include area codes when dialing such numbers. In earlier days, central office exchanges were known by mnemonics and most subscribers making local calls were only required to memorize a four or five digit number and an appropriate mnemonic (e.g., POplar 55399). Now, however, subscribers may be frequently required to enter a three-digit area code, a three-digit exchange code, and a four digit subscriber number plus other access numbers that may be required.

The recent rapid increases in the number of fax machines and cellular/mobile phones has only increased the rapid utilization of available phone numbers. As with subscriber numbers, exchange codes have also been completely utilized in some area codes in the U.S. This has made it necessary to add additional area codes in densely populated areas by splitting the existing area code domain into two or more separate area codes. Whereas only a few years ago (circa 1990), an area code might apply to an entire state in the United States, the ensuing proliferation of area codes has reached the point where four different area codes might lie within a radius of several miles. Further, the advent of area code overlay has led to a situation where multiple area codes can coexist at a single point, requiring 10-digit dialing even for local calls The result is confusion and complexity for the telephone user. Calls placed without the appropriate or new three-digit, destination area code currently result frequently in either an undesired connection, a phone company message about an area code change, or a recorded message that the number is simply not in service. In any of these events, the user is forced to redial the call using the revised "full" telephone number, provided that the caller can easily find that revised number. The full telephone number includes all digits, including area code and other prefix digits such as "0" or "1", that may be needed to reach the desired destination in the desired manner.

A number of aids have been developed to help subscribers formulate correct telephone numbers. Auto-dialers, for example, are well-known devices that enable subscribers to generate complete telephone numbers based on pre-programmed hotkeys or special code sequences; however, autodialers assume that the caller already knows the currently correct phone number. Autodialer data that has not been updated to reflect the latest area code changes will also yield the same frustrating results mentioned previously. A more sophisticated area code aid is described in U.S. Pat. No. 5,859,901, entitled "Intelligent Call Connection Service" and issued Jan. 12, 1999, to Brendzel et al. The Brendzel system operates on dialed sequences that do not contain area codes, and attempts to provide an appropriate area code by analyzing the called party number relative to the calling party. The analysis performed by the Brendzel system includes consideration of the calling pattern of the calling subscriber, and the distance between the calling party and the called party.

Despite the conveniences provided by auto-dialers and devices such as that described in the Brendzel patent, there remains a need for subscriber aids that will permit the subscriber to choose conveniently and efficiently the most appropriate area code by providing the subscriber with an analysis of any telephone number. The subscriber, for example, may desire to call a telephone number in a remote city (herein, "telephone number" refers to the exchange code and the subscriber number combination without area code) and may know an area code for that region, state or city. If the subscriber were presented with a list of valid area codes, within some proximity to the remote city, for the telephone number, then the subscriber could select the telephone number and area code combination that seemed most likely to be correct.

SUMMARY OF THE INVENTION

An object of the invention is to provide an automated system that would help telephone users select the proper area code for a call.

A further object of the invention is to provide an automated system for processing telephone numbers that responds to an activation sequence.

A further object of the invention is to provide an automated system for processing telephone numbers that utilizes identification information associated with the calling party in suggesting proper area codes for a call.

A further object of the invention is to provide an automated system for processing telephone numbers that utilizes a telephone number database that includes information on the relationship of area code service areas.

The present invention, as broadly described herein, provides an apparatus for processing telephone numbers that includes an area code processor and a caller interface. The area code processor has means, which are responsive to information about the called party, for producing a list of telephone numbers. The caller interface is in communication with the area code processor and a calling party, and has means for monitoring call initiation signals, means for receiving called party information that is responsive to the monitoring means, and means for selecting a target telephone number from the list of telephone numbers that is responsive to the means for producing a list of telephone numbers.

In a preferred embodiment of an apparatus of the present invention, the call initiation signals include an activation sequence.

In a preferred embodiment of an apparatus of the present invention, the receiving means includes means for associating identification information with the calling party.

In a preferred embodiment of an apparatus of the present invention, the telephone number database comprises information on valid area codes, information on the geographical areas associated with valid area codes, information on valid exchanges within valid area codes, information on geographical areas associated with valid exchanges, and information on the relationship of area code service areas.

The additional objects and advantages of the invention are set forth in part in the description which follows, and in part are obvious from the description, or may be learned by practice of the invention. The objects and advantages of the invention may also be realized and attained by means of the instrumentalities and combinations particularly set out in the appended claims.

BRIEF DESCRIPTION OF THE DRAWINGS

The accompanying drawings, which are incorporated in and constitute part of the specification, illustrate preferred embodiments of the invention, and together with the description, serve to explain the principles of the invention.

DETAILED DESCRIPTION OF THE PREFERRED EMBODIMENTS

Reference will now be made in detail to the present preferred embodiments of the invention, examples of which are illustrated in the accompanying drawings.

Figure 1:
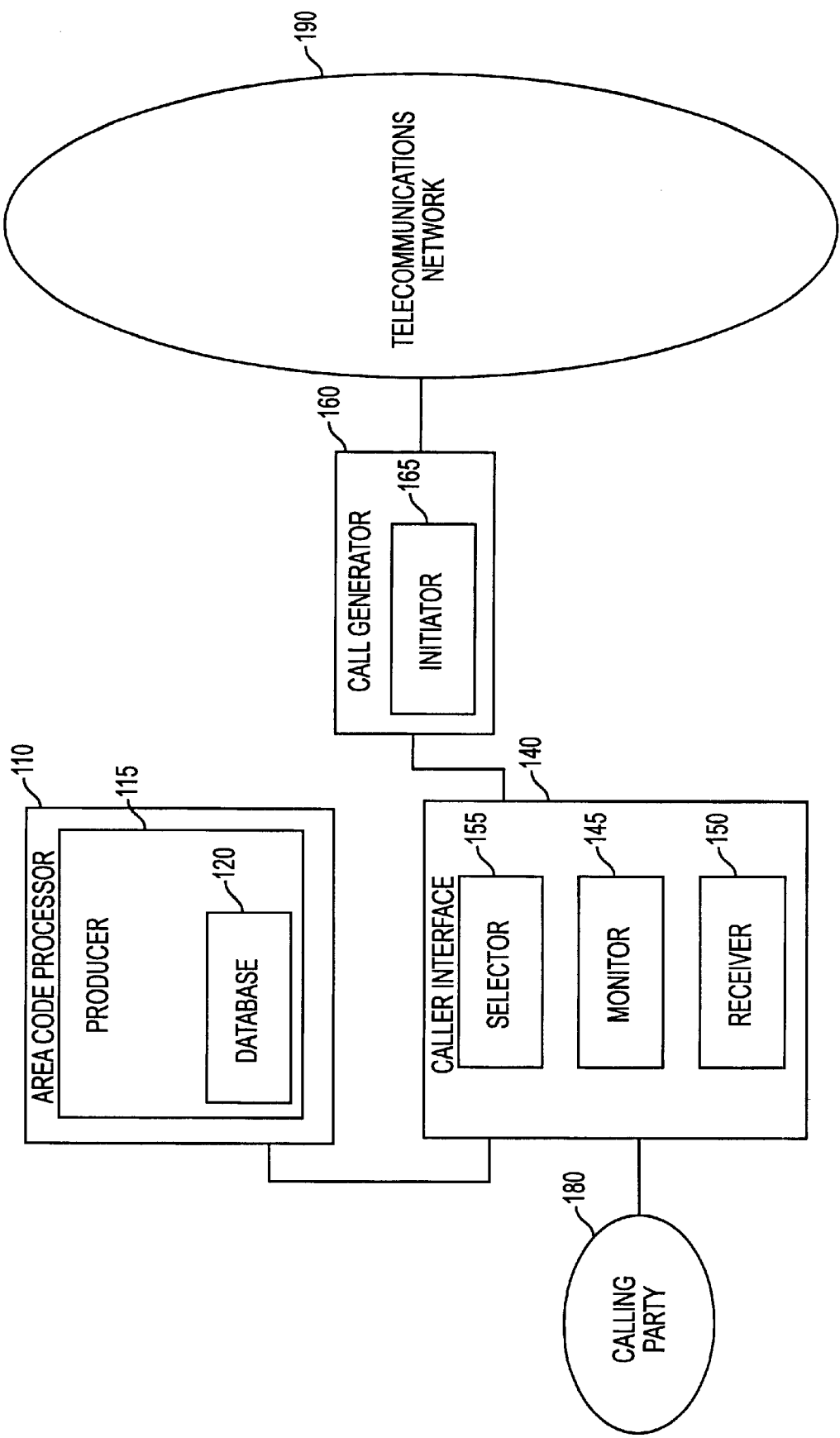
FIG. 1 is a diagram depicting preferred embodiments of an apparatus for processing telephone numbers.

FIG. 1 depicts preferred embodiments of an apparatus for processing telephone numbers. A preferred embodiment of the apparatus includes an area code processor and a caller interface. The area code processor has means, responsive to called party information, for producing a list of telephone numbers. The caller interface is in communication with the calling party and the area code processor, and has means for monitoring call initiation signals, means that are responsive to the monitoring means for receiving called party information, and means that are responsive to the producing means for selecting a target telephone number from the list of telephone numbers. A further preferred embodiment of the apparatus includes a call generator as well as the area code processor and the caller interface. The call generator has means for initiating a call to the target telephone number, and is responsive to the selecting means.

Preferred embodiments of the apparatus for processing telephone numbers of the present invention may be implemented in hardware, in software on general or special-purpose computer systems, or in a combination of hardware and software. These preferred embodiments may be integrated into a subscriber telephone unit, implemented as a stand-alone device connected to the subscriber's telephone line (including wireless, cable-TV lines, and other modes of telecommunication), implemented as a utility on a personal computer that may or may not be connected to the Internet or to a telephone line, or implemented as part of the telephone switching system. In alternative embodiments, the apparatus may be implemented as is known in the art.

The present invention may be employed with telephone systems using the North American Numbering Plan (NANP) or with other numbering schemes. The NANP scheme consists of a four-digit subscriber number, a three-digit exchange code, and a three-digit area code. In operation, the present invention attempts to suggest appropriate area codes and exchange codes when presented with a subscriber number alone; and attempts to suggest appropriate area codes when presented with a subscriber number and an exchange code, or with a subscriber number, an exchange code and an area code. When using the present invention with non-NANP numbering schemes, it is necessary to relate, as is known in the art, appropriate portions of the nonNANP numbering scheme to the subscriber number, exchange code, and area code elements.

In the preferred embodiments depicted in FIG. 1, the caller interface is Caller Interface 140. In this preferred embodiment, Caller Interface 140 is in communication with Calling Party 180 and with Area Code Processor 110. As is known in the art, Caller Interface 140 may be implemented in hardware, in software, or in a combination of hardware and software. In a preferred embodiment, Calling Party 180 is a subscriber using a subscriber telephone unit in communication with Caller Interface 140 through a standard subscriber telephone line. In an alternative preferred embodiment, Calling Party 180 is a personal computer user, Caller Interface 140 is implemented on a personal computer, and the personal computer user communicates with Caller Interface 140 through the keyboard of the personal computer. Calling Party 180 may access Caller Interface 140, in preferred embodiments, by other means as are known in the art.

In the preferred embodiments depicted in FIG. 1, the means for monitoring call initiation signals of the caller interface is Monitor 145. As is known in the art, Monitor 145 monitors call initiation signals emitted by Calling Party 180. In preferred embodiments, the call initiation signals may be standard telephone subscriber unit signaling or may be signals received from the keyboard of a personal computer, as is known in the art, that indicate a desire by Calling Party 180 to utilize the apparatus of the present invention.

In preferred embodiments, the apparatus of the present invention forms a transparent link between Calling Party 180 and a telecommunications network until Monitor 145 receives certain predesignated sequences as part of the call initiation signals. When one of these predesignated sequences is received, Monitor 145 activates, as is known in the art, the other functional elements of the present invention. For example, in a preferred embodiment, a predesignated sequence is four numerals followed by a long pause. When Calling Party 180 enters this predesignated sequence on his subscriber unit keypad, it is interpreted by Monitor 145 as signifying a desire to activate the present invention and the four numerals are interpreted as the four-digit subscriber number of a called party. In a preferred embodiment, the predesignated sequences are any call initiation signals that indicate that Calling Party 180 is attempting to place a telephone call. In a preferred embodiment, the predesignated sequences comprise call initiation signals that include a full telephone number. In a further preferred embodiment, the predesignated sequences comprise call initiation signals that include a telephone number without an area code. In a preferred embodiment, the predesignated sequences comprise call initiation signals that include a subscriber number without an area code or an exchange code. In an alternative preferred embodiment, the call initiation signals may contain a particular activation sequence, as is known in the art, and the predesignated sequences include this activation sequence. In this alternative preferred embodiment, the activation sequence may include a code character selected from the group consisting of # and *. These code characters are particularly useful when Calling Party 180 is using a standard subscriber telephone unit to communicate with the present invention.

In the preferred embodiments depicted in FIG. 1, the means for receiving called party information of the caller interface is Receiver 150. As described above, Receiver 150 is responsive to Monitor 145 and remains inactive, as is known in the art, until Monitor 145 receives a predesignated sequence. In response to Monitor 145, Receiver 150 receives called party information from Calling Party 180. In preferred embodiments, the called party information may be received as signaling from a standard telephone subscriber unit, signaling received from the keyboard of a personal computer, or other signaling as may be known in the art for transmitting called party information. Additional methods of communicating with Calling Party 180 are described below in connection with Selector 155. The called party information includes the subscriber number, and may also include the exchange code and/or the area code. As is known in the art, Receiver 150 makes the called party information available for use within Caller Interface 140 and Area Code Processor 110.

In a preferred embodiment, the Receiver 150 includes means for associating identification information with the calling party. For example, If the present invention is implemented at a central office location, then the central office provides Receiver 150 with identification information on the calling party, as is known in the art. In an alternative preferred embodiment, the calling party may provide a code or password to Receiver 150 that, in turn, is used by the associating means to access previously stored identification information for the calling party using the code or password. For example, in a preferred embodiment, if the present invention is accessed by means of a credit card call, then the credit card number would be used to access a "home" area code and exchange code associated with the owner of the credit card. Other means may be employed for associating identification information with the calling party as are known in the art.

In a preferred embodiment, the calling party identification information includes calling party location information. In a preferred embodiment, this calling party location information is a pre-designated "home" location for the calling party. In an alternative preferred embodiment, this calling party location information is derived from the telephone number of the telephone subscriber unit being used by Calling Party 180 to access the apparatus of the present invention.

In the preferred embodiments depicted in FIG. 1, the means for selecting a target telephone number from the list of telephone numbers is Selector 155. In this preferred embodiment, Selector 155 is responsive to Producer 115, which is described below, and obtains the list of telephone numbers from Producer 115. As is known in the art, Selector 155 is an interactive user interface with Calling Party 180. Selector 155 presents Calling Party 180 with the list of telephone numbers and permits Calling Party 180 to select a target telephone number from the list of telephone numbers. In preferred embodiments, Selector 155 stores the target telephone number for future use, provides the target telephone number to an auto-dialer for storage and future use, or provides the target telephone number to a call generator for initiation of a telephone call, as is known in the art, between Calling Party 180 and the target telephone number. If the list of telephone numbers contains only a single telephone number, then, in a preferred embodiment, Selector 155 automatically designates the single telephone number to be the target telephone number. In this case, however, in preferred embodiments, Selector 155 will still present the single telephone number to Calling Party 180 so that Calling Party 180 may note it.

As described below in connection with Producer 115, the list of telephone numbers may include valid telephone numbers in area code service areas within a predetermined scope responsive to calling party location information. When Selector 155 presents this list of telephone numbers to Calling Party 180, Calling Party 180 may determine that the predetermined scope is too narrow. In this case, Calling Party 180 can signal Selector 155 to request, as is known in the art, a new search by Area Code Processor 110 based on a predetermined expanded-scope. This request is communicated by Selector 155 to Area Code Processor 110.

As is known in the art, Selector 155 may perform other user interface functions related to controlling the operation of the apparatus of the present invention. For example, Calling Party 180 may select formats for the display of the list of telephone numbers through interaction with Selector 155.

The methods used by Selector 155 to interact with Calling Party 180 depend on the equipment used by Calling Party 180 to communicate with the apparatus of the present invention. If Calling Party 180 is using a standard telephone subscriber unit, then, as is known in the art, Calling Party 180 may use the touchpad of the subscriber unit while Selector 155 uses a voice synthesizer. If a subscriber unit used by Calling Party 180 includes a display screen, then Selector 155 may communicate using the display screen, or a voice synthesizer, or both. Similarly, if Calling Party 180 is using a personal computer, then Calling Party 180 may use the computer keyboard while Selector 155 communicates with Calling Party 180 through the computer's display screen, through a voice synthesizer, or both. A wide variety of other user interface devices may also be employed as are known in the art.

In the preferred embodiments depicted in FIG. 1, the area code processor is Area Code Processor 110. In the preferred embodiments, Area Code Processor 110 is in communication with Caller Interface 140. As is known in the art, Area Code Processor 110 may be implemented in hardware, in software, or in a combination of hardware and software. In a preferred embodiment Area Code Processor 110 is implemented as software on a personal computer.

In the preferred embodiments depicted in FIG. 1, the means for producing a list of telephone numbers of the area code processor is Producer 115. In preferred embodiments, Producer 115 is responsive to called party information obtained from Caller Interface 140 and produces a list of telephone numbers. The called party information is information provided by Calling Party 180 concerning the desired called party in a telephone call. The called party information may include a subscriber number alone, the subscriber number in combination with an exchange code, or a subscriber number in combination with an exchange code and an area code.

In the preferred embodiments depicted in FIG. 1, Producer 115 includes telephone number Database 120. In a preferred embodiment, telephone number Database 120 includes information on valid area codes, information on the geographical areas associated with valid area codes, information on valid exchanges within valid area codes, and information on geographical areas associated with valid exchanges. As used herein in reference to telephone number Database 120, the word "valid" merely means that a telephone company or NANP Administrator has made the number or area code in question available for service. It does not mean that a particular number is actually in service at a particular time. "Geographical areas" generally refers to political divisions such cities, towns, suburbs, and regions, but may, in preferred embodiments, refer to geographical coordinates or to other indicators of spatial location as are known in the art.

In a preferred embodiment, Producer 115 includes means, as are known in the art, for updating telephone number Database 120. For example, if the apparatus of the present invention is implemented on a personal computer, then Database 120 may be periodically updated by contacting a server on the Internet. If the apparatus of the present invention is connected to a public switched telephone network, then Database 120 may be updated by dialing into a special database update site. In situations where updating Database 120 is difficult, it may be beneficial to limit the amount of information included in Database 120 to information, such as area codes and exchange codes, that do not change as frequently as, for example, subscriber numbers.

In response to the called party information, Producer 115 produces, with reference to telephone number Database 120, a list of telephone numbers. This list of telephone numbers contains only valid telephone numbers, as determined by telephone number Database 120, that are related to the called party information. For example, if the called party information includes a subscriber number, an exchange code, and an area code, then Producer 115 determines from Database 120, as is known in the art, if the given area code and exchange code combination is valid. If the combination is valid then the list of telephone numbers produced by Producer 115 includes the given subscriber number, exchange code, and area code, along with information concerning the geographical area or other available information associated with the exchange code and area code combination. The list of telephone numbers and other information is passed by Caller Interface 140 to Calling Party 180. If the combination is not valid, then this discrepancy is passed to Caller Interface 140 for transmission to Calling Party 180.

In a preferred embodiment, telephone number Database 120 additionally includes information on the valid subscriber telephone numbers within valid exchanges. In a preferred embodiment, information concerning subscribers, such as their names, is stored in Database 120 and associated with the valid subscriber telephone numbers. Similarly to the previous example, if the called party information includes a subscriber number, an exchange code, and an area code, then Producer 115 determines from Database 120, as is known in the art, if the given area code, exchange code, and subscriber number combination is valid and proceeds as in the previous example, where, however, information concerning subscribers, associated with telephone numbers on the list of telephone numbers, could also be made known to Calling Party 180.

In a preferred embodiment, telephone number Database 120 additionally includes information on the relationship of area code service areas. In preferred embodiments, this relationship information may indicate the geographic proximity of area code service areas to each other, or may indicate the likelihood that a call to a particular area code service area was, in fact, intended for a different particular area code service area. As an example of the latter, a call to a number in the 301 area code in western Maryland, which includes areas close to Washington, D.C., may have been intended for the 202 area code in Washington, D.C., the 703 area code in northern Virginia which also includes areas close to Washington, D.C., or the 240 area code that overlays the 301 area code. A call to a number in the 301 area code could, however, have been intended for other area codes in the region such as area code 410 in eastern Maryland, the 443 overlay area code of area code 410, area code 302 in Delaware, or area code 717 in Pennsylvania. Two predetermined standards of scope, based on information on the relationships between area code service areas, may be created so that certain area codes are designated to be within a predetermined scope of a specific area code, while those and additional area codes may be designated to be within a predetermined expanded-scope of that area code. Continuing the 301 western Maryland area code example, the predetermined scope of the 301 area code could be the 301, 703, 202, and the 240 area codes, while the predetermined expanded scope could be the 301, 703, 202, 240, 410, 443, 302, and 717 area codes. Area codes assigned to wireless service, in whole or in part, may be part of the predetermined scope or the predetermined expanded-scope of a specific area code.

In a preferred embodiment, at least one predesignated area code service area is considered to be within the predetermined scope. In a further preferred embodiment, at least one predesignated area code is a toll-free service access code. In some situations it may be desirable to consider at least one area code service area to be within the predetermined scope of all other area code service areas. For example, if a particular Calling Party 180 very frequently calls a particular area code service area, then it may be desirable to assume that any calls made by that Calling Party 180 may be intended for that particular area code service area. It may also be beneficial to assume that tollfree service access codes have nationwide service areas and are, therefore, within the predetermined scope of each other.

In preferred embodiments utilizing predetermined scope and predetermined expanded-scope designations, the list of telephone numbers produced by Producer 115 may include valid telephone numbers in area code service areas within a predetermined scope or an predetermined expanded-scope responsive to the called party information. For example, the called party information may include a valid subscriber number, exchange code, and area code for a telephone number ("the called number") in the San Francisco area. Using the predetermined scope designations, the list of telephone numbers presented to Calling Party 180 by Selector 155 would then include the called number, as well as other valid telephone numbers within the predetermined scope of the called number that have the same subscriber number and exchange code as the called number, but different area codes In this same example, but using the predetermined expanded-scope designations, the list of telephone numbers presented to Calling Party 180 by Selector 155 would include the called number, as well as other valid telephone numbers within the predetermined expanded-scope of the called number that have the same subscriber number and exchange code as the called number. Since the list of telephone numbers presented to Calling Party 180 by Selector 155 in both examples would include geographical information on the area code service areas of each number, Calling Party 180 could determined the most likely telephone number for the called party based on this geographical information.

Continuing consideration of preferred embodiments that utilize the predetermined scope and predetermined expanded-scope designations, an area code and an exchange code provided in the called party information may not be found to be a valid combination. In this case, the present invention assumes that the exchange code provided is correct and that the area code provided is in the predetermined scope or the predetermined expanded-scope of the correct area code of the called party. Thus, continuing the example and using the predetermined scope designations, the list of telephone numbers presented to the Calling Party 180 by Selector 155 would not include the called number but would include other valid telephone numbers within the predetermined scope of the called number that have the same subscriber number and exchange code as the called number. Similarly, but using the predetermined expanded-scope designations, the list of telephone numbers would not include the called number but would include other valid telephone numbers within the predetermined expanded-scope of the called number that have the same subscriber number and exchange code as the called number. In a preferred embodiment, when the called number is not found to be valid, Selector 155 provides this information to Calling Party 180 through a separate message, as is known in the art.

In the above examples, the apparatus of the present invention is able to provide useful information concerning the validity of telephone numbers without any reference to location or other information about Calling Party 180. The apparatus acquires additional utility, however, when information about Calling Party 180 is known.

As described above in reference to Receiver 150, in preferred embodiments, identification information is associated with the calling party, and this identification information includes calling party location information. In a preferred embodiment, the list of telephone numbers includes valid telephone numbers in area code service areas within a predetermined scope responsive to calling party location information. In a further preferred embodiment, the list of telephone numbers includes valid telephone numbers in area code service areas within an predetermined expanded-scope responsive to calling party location information. These preferred embodiments perform in a similar manner to the San Francisco example provided above where, however, the called party information does not include an area code. In these cases, an area code is derived from the calling party location information, as is known in the art, and is used as the area code of the called party. Thus, in preferred embodiments where calling party location information is available and where the called party area code is not provided, the predetermined scope or predetermined expanded-scope is determined with reference to the location of the calling party.

In a preferred embodiment, the called party information may include a subscriber number but no exchange code or area code. In this situation, the area code and exchange code derived from the calling party location information are added to the called party information, and the called party information is then processed by Producer 115 using predetermined scope and predetermined expanded-scope as described above. In this situation, in an alternative preferred embodiment, Database 120 further comprises information on the relationship of central office exchanges similar to the information on the relationship of area code service areas, and the predetermined scope and predetermined expanded-scope are defined for central office exchanges as well as area codes. In this alternative preferred embodiment, the area code and exchange codes derived from the calling party location information are added to the called party information, and the called party information is then processed by Producer 115 using predetermined scope or predetermined expanded-scope applied to both area codes and exchanges.

In the preferred embodiments depicted in FIG. 1, the call generator is Call Generator 160. In a preferred embodiment, Call Generator 160 is in communication with Caller Interface 140 and Telecommunications Network 190. As is known in the art, Call Generator 160 may be implemented in hardware, in software, or in a combination of hardware and software. In a preferred embodiment, Telecommunications Network 190 is a public switched telephone network. In an alternative preferred embodiment, Telecommunications Network 190 is the Internet. In preferred embodiments, and as is known in the art, Telecommunications Network 190 may be a public or private network, implemented using circuit switched, packet switched, or point-to-point communications techniques and technologies, and accessed through conventional wires, cable-TV lines, or wireless modes.

In a preferred embodiment depicted in FIG. 1, the means for initiating a call to the target telephone number of Call Generator 160 is Initiator 165. In this preferred embodiment, Initiator 165 is responsive to Selector 155. As described above, Selector 155 selects a target telephone number through interaction with Calling Party 180 and provides the target telephone number to Call Generator 160. Initiator 165 then, as is known in the art, initiates a telephone call to the target telephone number. In preferred embodiments, Calling Party 180 may, through interaction with Selector 155, direct Initiator 165 to abort the telephone call or to dial the telephone number, provided by Calling Party 180 as part of the called party information, exactly as provided. In a preferred embodiment, whenever the list of telephone numbers contains only a single telephone number, Selector 155 automatically designates the single telephone number as the target telephone number and provides that number to Call Generator 160 for initiation of a telephone call without consulting Calling Party 180.

Figure 2:
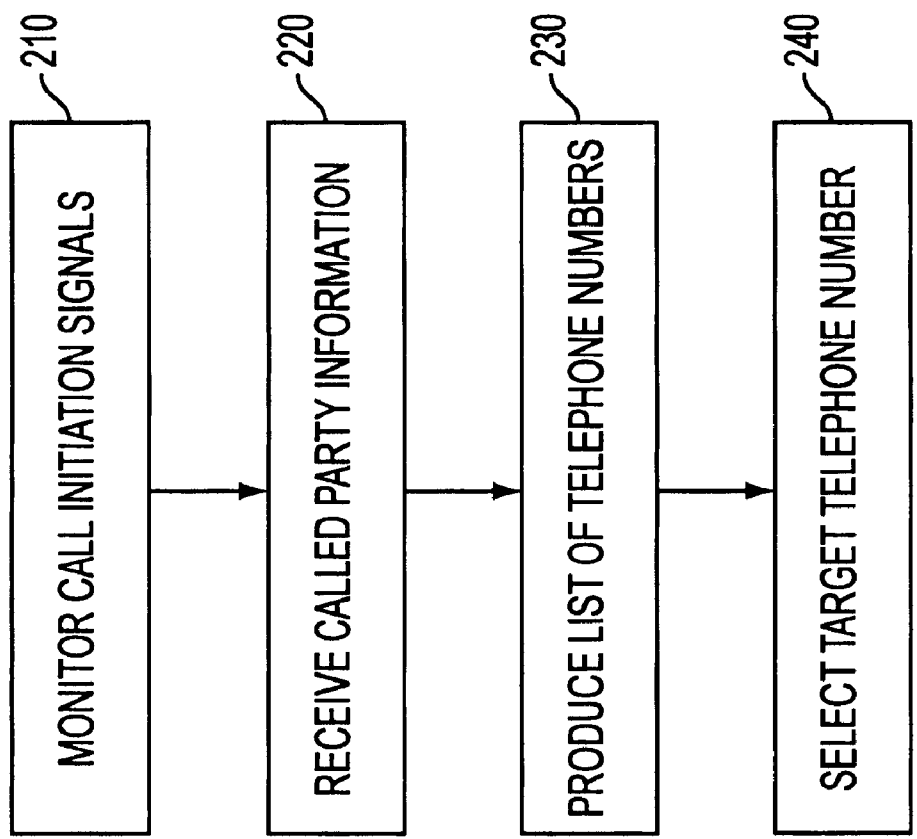
FIG. 2 is a flowchart depicting a preferred embodiment of a method for processing telephone numbers.

FIG. 2 depicts a flowchart of a preferred embodiment of a method for processing telephone numbers. This method includes the steps of monitoring call initiation signals from a calling party; receiving called party information in response to the monitoring step; producing a list of telephone numbers in response to the called party information; and selecting a target telephone number from the list of telephone numbers in response to the producing step. Preferred embodiments of the method for processing telephone numbers of the present invention may be implemented in hardware, in software on general or special-purpose computer systems, or in a combination of hardware and software. Integration of these preferred embodiments into subscriber telephone units, personal computers, or other devices may be performed as described above in reference to FIG. 1.

In the preferred embodiment depicted in FIG. 2, the step of monitoring call initiation signals from a calling party is accomplished by Monitor Call Initiation Signals step 210. As is known in the art, Monitor Call Initiation Signals step 210 monitors call initiation signals emitted by a calling party. Additional information concerning the monitoring function and call initiation signals is provided above in reference to Monitor 145 and Calling Party 180 depicted in FIG. 1. In a preferred embodiment, the call initiation signals contain an activation sequence. In a further preferred embodiment, the activation sequence includes a code character selected from the group consisting of # and *. Additional information concerning activation sequences is also provided in reference to Monitor 145 depicted in FIG. 1.

In the preferred embodiment depicted in FIG. 2, the step of receiving called party information is accomplished by Receive Called Party Information step 220. In response to Monitor Call Initiation Signals step 210, Receive Called Party Information step 220 receives called party information from the calling party. Additional information concerning the receiving function and called party information is provided above in reference to Receiver 150 depicted in FIG. 1. In a preferred embodiment, Receive Called Party Information step 220 includes the step of associating identification information with the calling party. In a preferred embodiment, the identification information includes calling party location information. Additional information concerning identification information and calling party location information is provided above in reference to Receiver 150.

In the preferred embodiment depicted in FIG. 2, the step of producing a list of telephone numbers is accomplished by Produce List Of Telephone Numbers step 230. In response to the called party information, Produce List Of Telephone Numbers step 230 produces a list of telephone numbers. Additional information concerning the producing function is provided above in reference to Producer 115 depicted in FIG. 1. In a preferred embodiment, Produce List Of Telephone Numbers step 230 includes the use of a telephone number database. In a further preferred embodiment, the telephone number database includes information on valid area codes, information on the geographical areas associated with valid area codes, information on valid exchanges within valid area codes, and information on geographical areas associated with valid exchanges. In a further preferred embodiment, the telephone number database includes information on valid telephone numbers within valid exchanges.

In a preferred embodiment, Produce List Of Telephone Numbers step 230 includes the step of updating the telephone number database. Additional information concerning the database updating function is provided above in reference to Producer 115 and Database 120, depicted in FIG. 1.

In a preferred embodiment, the telephone number database includes information on the relationship of area code service areas. As described above in more detail in reference to Database 120, depicted in FIG. 1, in preferred embodiments, this relationship information may indicate the geographic proximity of area code service areas to each other, or may indicate the likelihood that a call to a particular area code service area was, in fact, intended for a different particular area code service area. Two predetermined standards of scope based on relationship information may be created so that certain area codes are designated to be within a predetermined scope of a specific area code, while those and additional area codes may be designated to be within an predetermined expanded-scope of the specific area code.

In a preferred embodiment, the list of telephone numbers includes valid telephone numbers in area code service areas within a predetermined scope responsive to calling party location information. In a further preferred embodiment, the list of telephone numbers includes valid telephone numbers in area code service areas within an predetermined expanded-scope responsive to the calling party location information. Additional information concerning the predetermined scope and the predetermined expanded-scope are provided above in reference to Database 120, depicted in FIG. 1.

In a preferred embodiment, at least one predesignated area code service area is considered to be within the predetermined scope. In a further preferred embodiment, at least one pre-designated area code is a toll-free service access code. Additional information concerning pre-designated area code service areas and toll-free service access codes is provided above in reference to Database 120 depicted in FIG. 1.

In the preferred embodiment depicted in FIG. 2, the step of selecting a target telephone number from the list of telephone numbers is accomplished by Select Target Telephone Number step 240. In response to Produce List Of Telephone Numbers step 230, Select Target Telephone Numbers step 240 obtains the list of telephone numbers, presents the calling party with the list of telephone numbers, and permits the calling party to select the target telephone number from the list. Additional information concerning the selection function is provided above in reference to Selector 155, depicted in FIG. 1.

In a preferred embodiment not depicted in FIG. 2, the method for processing telephone numbers of the present invention includes the steps of monitoring call initiation signals from a calling party; receiving called party information in response to the monitoring step; producing a list of telephone numbers in response to the called party information; selecting a target telephone number from the list of telephone numbers in response to the producing step; and initiating a call to the target telephone number through a telecommunications network in response to the selecting step. In a preferred embodiment, the monitoring step, the receiving step, the producing step, and the selecting step are performed as described above in reference to FIG. 2. In a preferred embodiment, the step of initiating a call to the target telephone number through a telecommunications network is performed by initiating a telephone call, as is known in the art and in response to the selecting step, to the target telephone number. Additional information concerning the initiating function and the telecommunications network is provided above in reference to Call Generator 160, depicted in FIG. 1.

It will be apparent to those skilled in the art that various modifications can be made to this invention of an apparatus and method for processing telephone numbers, without departing from the scope or spirit of the invention or of the claims. It is also intended that the present invention and appended claims cover modifications, variations, and equivalents of the apparatus and method for processing telephone numbers of the present invention.

I claim:

1. An apparatus for processing telephone numbers, comprising:
   an area code processor having
      means, responsive to called party information, for producing a list of telephone numbers; and
   a caller interface, in communication with a calling party and the area code processor, having
      means for monitoring call initiation signals,
      means, responsive to the monitoring means, for receiving called party information, and means, responsive to the producing means, for selecting a target telephone number from the list of telephone numbers.

2. The apparatus for processing telephone numbers of claim 1, wherein the call initiation signals contain an activation sequence.

3. The apparatus for processing telephone numbers of claim 2, wherein the activation sequence comprises a code character selected from the group consisting of # and *.

4. The apparatus for processing telephone numbers of claim 1, wherein the receiving means comprises means for associating identification information with the calling party.

5. The apparatus for processing telephone numbers of claim 4, wherein calling party identification information includes calling party location information.

6. The apparatus for processing telephone numbers of claim 5, wherein the list of telephone numbers comprises valid telephone numbers in area code service areas within a predetermined scope responsive to calling party location information.

7. The apparatus for processing telephone numbers of claim 6, wherein the list of telephone numbers comprises valid telephone numbers in area code service areas within a predetermined expanded-scope responsive to calling party location information.

8. The apparatus for processing telephone numbers of claim 6, wherein at least one pre-designated area code service area is considered to be within the predetermined scope.

9. The apparatus for processing telephone numbers of claim 8, wherein at least one pre-designated area code is a toll-free service access code.

10. The apparatus for processing telephone numbers of claim 1, wherein the producing means comprises a telephone number database.

11. The apparatus for processing telephone numbers of claim 10, wherein the telephone number database comprises information on valid area codes, information on the geographical areas associated with valid area codes, information on valid exchanges within valid area codes, and information on geographical areas associated with valid exchanges.

12. The apparatus for processing telephone numbers of claim 11, wherein the telephone number database further comprises information on valid telephone numbers within valid exchanges.

13. The apparatus for processing telephone numbers of claim 11, wherein the telephone number database further comprises information on the relationship of area code service areas.

14. The apparatus for processing telephone numbers of claim 10 wherein the producing means further comprises means for updating the telephone number database.

15. The apparatus for processing telephone numbers of claim 1, further comprising a call generator, in communication with the caller interface and a telecommunications network, having means, responsive to the selecting means, for initiating a call to the target telephone number.

16. A method for processing telephone numbers, comprising the steps of:

monitoring call initiation signals from a calling party;

receiving, responsive to the monitoring step, called party information;

producing, responsive to the called party information, a list of telephone numbers; and selecting, responsive to the producing step, a target telephone number from the list of telephone numbers.

17. The method for processing telephone numbers of claim 16, wherein the call initiation signals contain an activation sequence.

18. The method for processing telephone numbers of claim 17, wherein the activation sequence comprises a code character selected from the group consisting of # and *.

19. The method for processing telephone numbers of claim 16, wherein the receiving step comprises the step of associating identification information with the calling party.

20. The method for processing telephone numbers of claim 19, wherein identification information includes calling party location information.

21. The method for processing telephone numbers of claim 20, wherein list of telephone numbers comprises valid telephone numbers in area code service areas within a predetermined scope responsive to calling party location information.

22. The method for processing telephone numbers of claim 21, wherein the list of telephone numbers comprises valid telephone numbers in area code service areas within a predetermined expanded-scope responsive to the calling party location information.

23. The method for processing telephone numbers of claim 21, wherein at least one pre-designated area code service area is considered to be within the predetermined scope.

24. The method for processing telephone numbers of claim 23, wherein at least one pre-designated area code is a toll-free service access code.

25. The method for processing telephone numbers of claim 16, wherein the producing step comprises the use of a telephone number database.

26. The method for processing telephone numbers of claim 25, wherein the telephone number database comprises information on valid area codes, information on the geographical areas associated with valid area codes, information on valid exchanges within valid area codes, and information on geographical areas associated with valid exchanges.

27. The method for processing telephone numbers of claim 26, wherein the telephone number database further comprises information on valid telephone numbers within valid exchanges.

28. The method for processing telephone numbers of claim 26, wherein the telephone number database further comprises information on the relationship of area code services areas.

29. The method for processing telephone numbers of claim 25, wherein the producing step further comprises the step of updating the telephone number database.

30. The method for processing telephone numbers of claim 16, further comprising the step of initiating, responsive to the selecting step, a call to the target telephone number through a telecommunications network.

* * * * *